March 21, 1967        G. KIPER        3,309,978
CAMERA SHUTTER WHICH ALSO FUNCTIONS AS A DIAPHRAGM
Filed Jan. 29, 1965        4 Sheets-Sheet 1
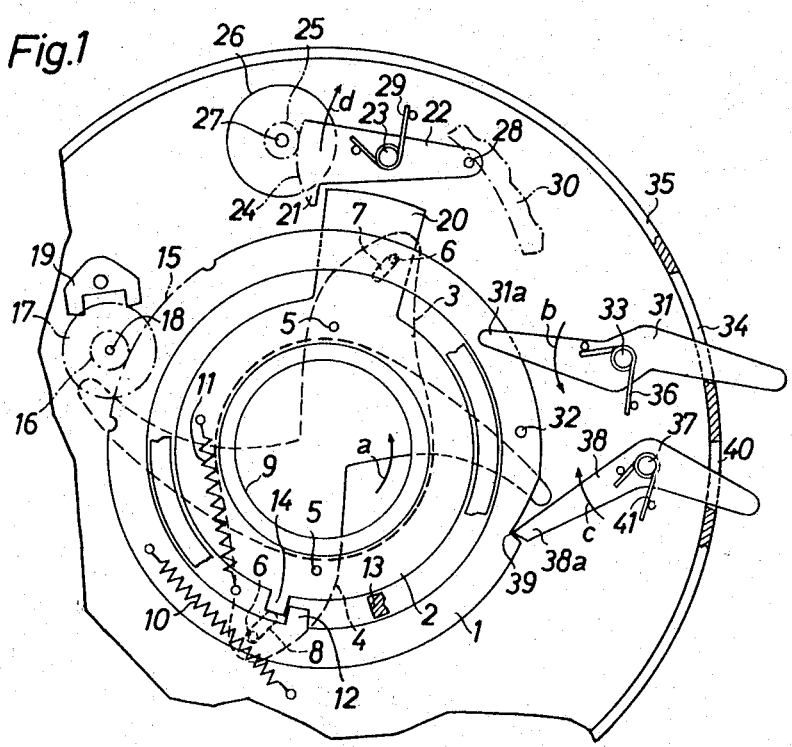
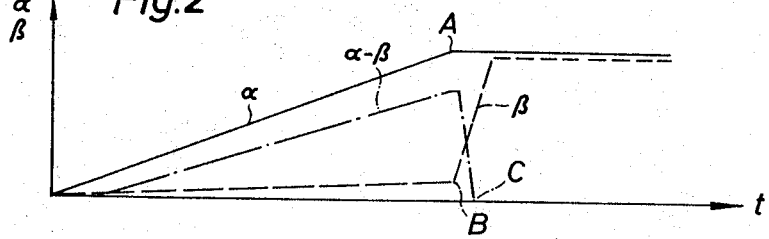
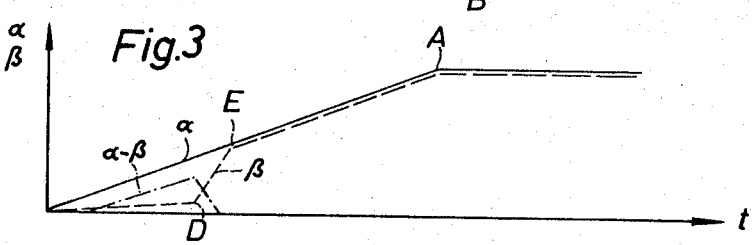
INVENTOR.
GERD KIPER
BY Michael J. Striker March 21, 1967 G. KIPER 3,309,978
CAMERA SHUTTER WHICH ALSO FUNCTIONS AS A DIAPHRAGM
Filed Jan. 29, 1965 4 Sheets-Sheet 2

INVENTOR.
GERD KIPER
BY
Michael J. Striker
Attorney

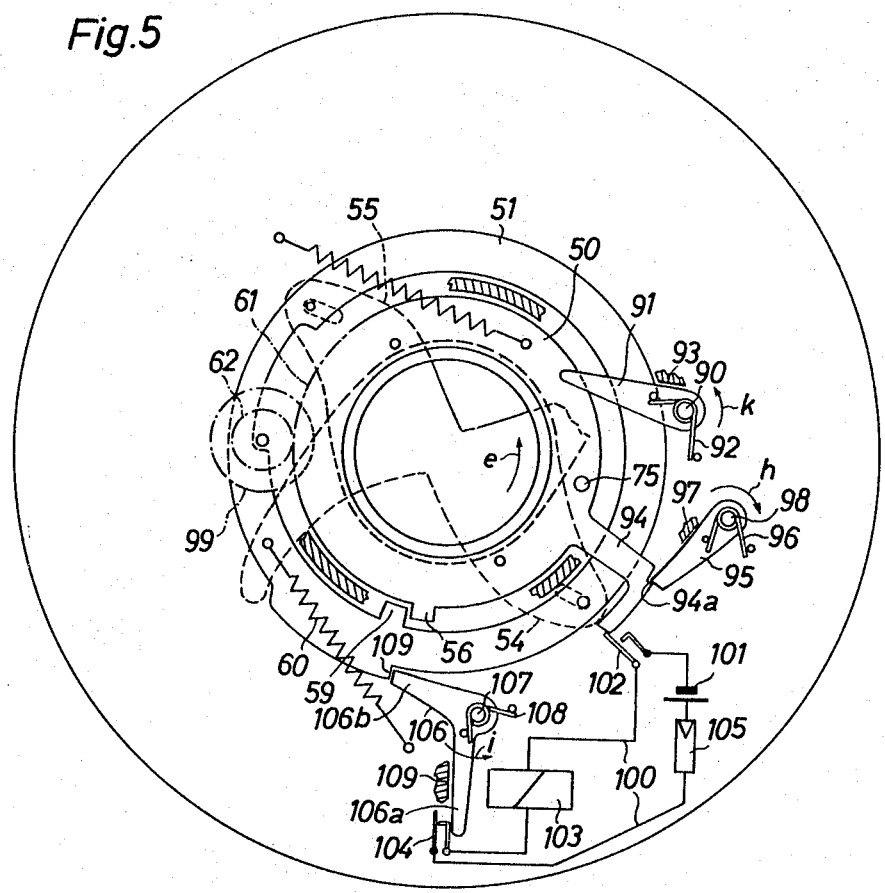

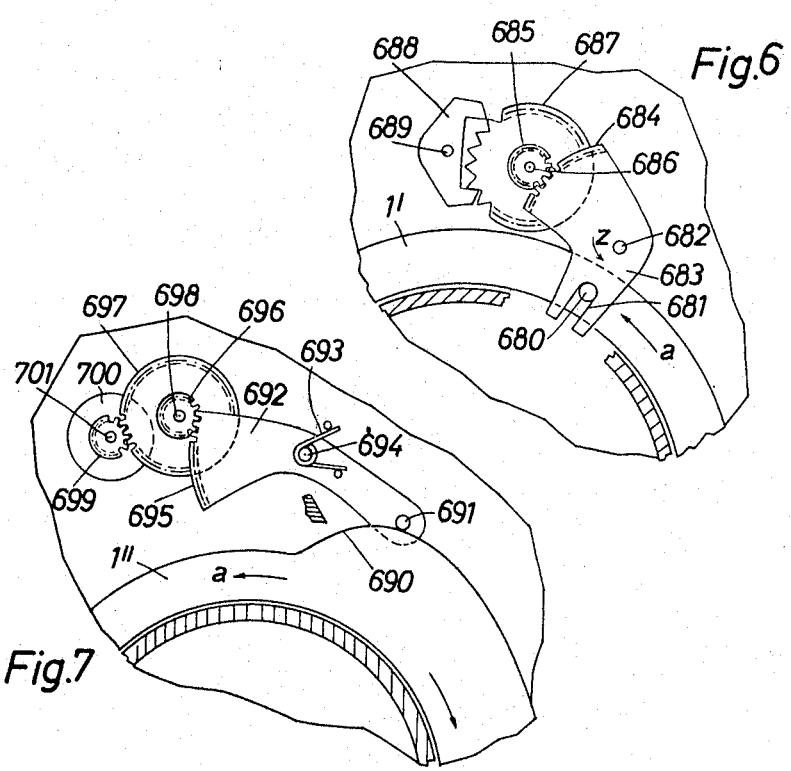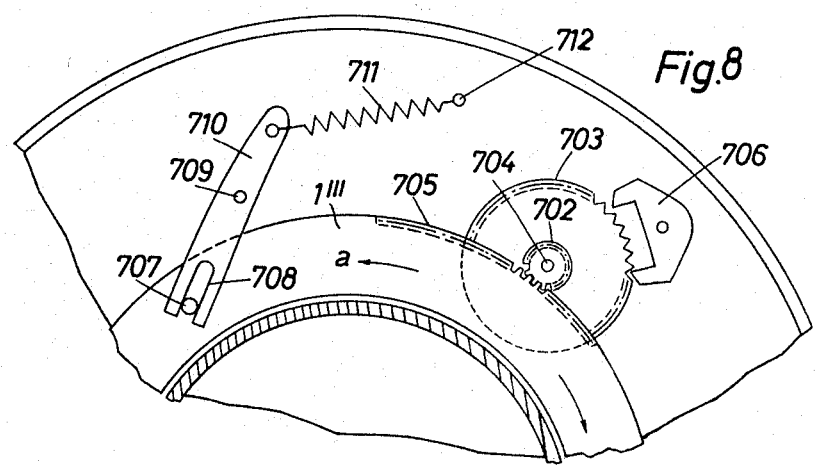

United States Patent Office 3,309,978
Patented Mar. 21, 1967

3,309,978
CAMERA SHUTTER WHICH ALSO FUNCTIONS
AS A DIAPHRAGM
Gerd Kiper, Unterhaching, near Munich, Germany, assignor to AGFA Aktiengesellschaft, Leverkusen, Germany
Filed Jan. 29, 1965, Ser. No. 428,931
Claims priority, application Germany, Oct. 5, 1963,
A 44,226; Aug. 1, 1964, A 46,752
12 Claims. (Cl. 95—63)

This application is a continuation-in-part of application Ser. No. 400,539, filed Sept. 30, 1964, and entitled, "Camera Shutter Which Also Functions as a Diaphragm."

The present invention relates to cameras.

More particularly, the present invention relates to shutters of cameras and especially to that type of shutter which is also capable of functioning as a diaphragm.

One of the primary objects of the present invention is to provide for a shutter of this type a construction which renders it extremely convenient to accurately control both the exposure time and the size of the aperture.

In particular it is an object of the present invention to provide a structure which is capable of regulating the instant when the closing of the shutter starts so as to control in this way not only the exposure time but also the size of the aperture.

Furthermore, it is an object of the present invention to provide for a construction of the above type an extremely wide range of adjustments so that, for example, even relatively large exposure times can be combined with relatively large apertures, and at the same time extremely small exposure times and apertures can also be provided.

It is in particular an object of the present invention to provide a structure of the above type which is automatically adjustable for providing a proper exposure according to the lighting conditions.

Furthermore it is an object of the present invention to provide a structure of the above type which lends itself to manual adjustment.

The objects of the present invention also include the provision of a construction which is extremely simple as well as very rugged and reliable in operation.

With a shutter which has both leading and trailing rings and where both of these rings are retarded it is possible to provide relatively short exposure times when there is a considerable amount of light, but there is a difficulty in providing a relatively short exposure time with a relatively small amount of light. The inertia of the components of such a construction, while permitting relatively short exposure times at relatively high light values, prevent relatively short exposure times from being achieved at low light values, and as a result at low light values it is difficult to eliminate the effects of unsteadiness in holding the camera from the exposure which is made, so that at low light values blurring in the photograph can easily result from the fact that a relatively large exposure time will necessarily be produced and therefore it will not be possible to eliminate motion of the camera itself in the hands of the operator.

It is therefore also an object of the present invention to provide for a camera of the above type the possibility of achieving relatively short exposure times even at low light values when there is not very much light available, so that even under these conditions a hand-held camera will not result in undesirable blurring of the photograph due to unsteadiness of the operator.

With these objects in view the invention includes, in a camera, a plurality of shutter blades and a pair of coaxial shutter ring means which are operatively connected to the shutter blades for opening and closing them. One of the shutter ring means is a leading ring means which returns from a cocked position to a rest position in advance of the other of the ring means, which is a trailing ring means, so that in this way the shutter blades can be opened to make an exposure. The trailing ring means, when it follows the leading ring means to its rest position, returns the blades to their closed position. In accordance with the present invention a first retarding means is operatively connected to the leading ring means for retarding the return thereof to its rest position during the entire return movement of this leading ring means. Also, the structure of the invention includes an adjustable second retarding means which is operatively connected to the trailing ring means for retarding the release thereof, for return from a cocked to a rest position, to an extent which is adjustable for releasing the trailing ring means before, at, or after the end of the return movement of the leading ring means.

In accordance with a particular feature of the present invention, the first retarding means which is operatively connected with the leading ring means retards the return movement thereof from its cocked to its rest position to an increasing extent during this return movement so that during the initial part of the return movement of the leading ring means, it is possible for this leading ring means to rapidly accelerate and thus provide relatively short exposure times.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly schematic elevational view of one possible embodiment of a shutter structure according to the present invention;

FIG. 2 is a graphic illustration of the operation of the structure of FIG. 1 at one setting thereof;

FIG. 3 is a graphic illustration of the operation of the structure of FIG. 1 at another setting thereof;

FIG. 5 is a partly sectional fragmentary elevation of a still further embodiment of a structure according to the present invention;

Figure 4:
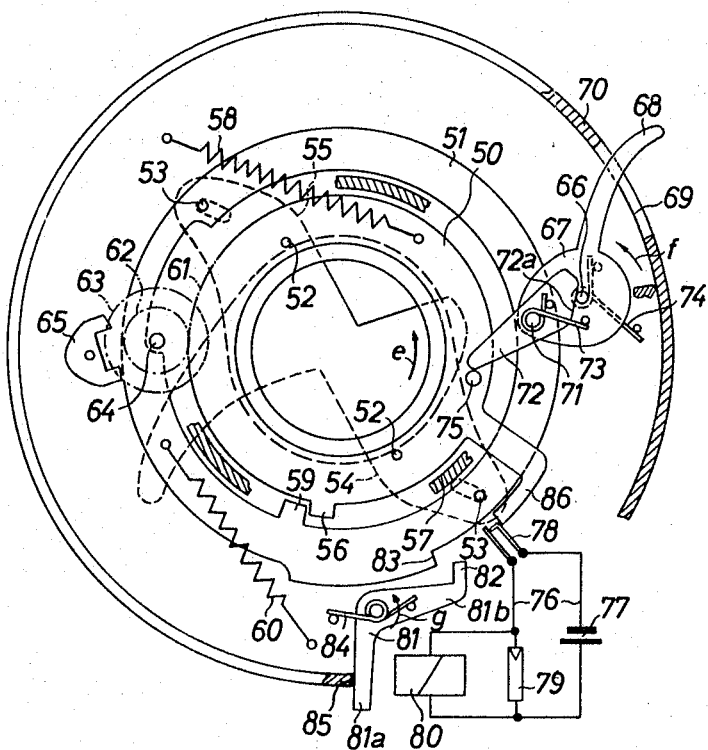
FIG. 4 is a partly sectional elevation of another embodiment of a structure according to the present invention.

FIG. 6 fragmentarily illustrates another possible embodiment of a retarding means which cooperates with the leading ring of the shutter;

FIG. 7 illustrates a further embodiment of a retarding means cooperating with the leading ring; and FIG. 8 is a fragmentary illustration of yet another embodiment of a retarding means cooperating with the leading ring of the shutter.

Referring now to FIG. 1, there is illustrated therein a shutter which includes a pair of shutter rings 1 and 2, and these rings are supported for independent coaxial turning movement relative to each other as well as together. The illustrated shutter also includes a pair of shutter blades 3 and 4 which are pivotally connected with the ring 2 by a pair of pins 5 so that the blades 3 and 4 can turn about the pins 5 relative to the ring 2. Although only a pair of shutter blades are illustrated, it is to be understood that the invention is not limited to a structure which includes only a pair of shutter blades and can also be applied to shutters which include more than a pair of shutter blades. The shutter ring 1 also carries a pair of pins 6, and these pins 6 respectively extend into slots 7 and 8 which are respectively formed in the shutter blades 3 and 4. Thus, with this construction when the rings 1 and 2 turn together, so that there is no relative movement therebetween, the blades will not turn relative to each other and they will remain in a closed position, for example, while when one of the rings turns relative to the other the blades will be displaced either from a closed to an open position or from an open to a closed position.

The shutter of FIG. 1 is illustrated in its cocked position where the blades of course overlap each other and extend completely across the opening 9 through which an exposure is made, so that the shutter is closed in the cocked position illustrated in FIG. 1.

The ring 1 is a leading ring means which returns from the illustrated cocked position to its rest position in advance of the ring 2, which is a trailing ring means, so that in this way the turning of the ring 1 relative to the ring 2 will cause the blades to turn and thus the shutter will be opened in order to make an exposure. The trailing ring means then follows the leading ring means to its rest position, and then the rings 1 and 2 resume the illustrated angular position relative to each other, so that the blades are again closed.

A spring 10 is operatively connected with the leading ring 1 urging the latter to its rest position, and a spring 11 is operatively connected with the trailing ring 2 for urging the latter to return to its rest position, these rings turning in the direction of the arrow $a$, shown in FIG. 1, during return of the rings from their cocked to their rest positions. The leading ring 1 carries an inwardly directed projection 12 which engages a stationary stop member 13 in order to limit the turning of the ring 1 by the spring 10, and in this way the rest position of the ring 1 is determined, and the trailing ring 2 has an outwardly directed projection 14 engaging the projection 12 so that by engaging this latter projection 12 when the latter engages the projection 13 the rest position of the trailing ring 2 is also determined.

In accordance with one of the features of the present invention the leading ring 1 has a part of its periphery provided with gear teeth 15 which mesh with a pinion 16 which is coaxially fixed with an escapement wheel 17, and the pinion 16 and escapement wheel 17 are both supported for rotary movement by a stationary shaft 18. The supporting wall of the shutter housing not only supports the shaft 18 on which elements 16 and 17 are mounted for rotation, but also supports for pivotal movement the escapement anchor 19 which cooperates with the escapement wheel 17. Thus, the parts 16–19 form a retarding means which retards the return of the leading ring 1 to its rest position by the spring 10, and the design of the retarding means 16–19 is such that the ring 1 is retarded in a substantially uniform manner throughout its entire return movement from its cocked position to its rest position in the direction of the arrow $a$.

The trailing ring means 2 includes an arm 20 which projects substantially radially from the ring 2, and a second, adjustable retarding means of the present invention cooperates with this arm 20 of the trailing ring means 2. The adjustable retarding means includes an elongated retarding lever 22 which at one end has a projection 21 situated in the path of movement of the projection 20 of the ring 2 when the latter seeks to return to its rest position under the action of the spring means 11. The retarding lever 22 is supported for rotary movement by a stationary shaft 23. That end of the lever 22 which is provided with the projection 21 which is situated in the path of movement of the projection 20 is also provided with a plurality of gear teeth 24 arranged along a circle whose center is in the axis of turning of the pivot pin 23, and this gear sector 24 meshes with a pinion 25 which is coaxially fixed with a rotary mass 26 which together with the pinion 25 are mounted for free rotary movement on the stationary pin 27 which is carried by the transverse wall of the shutter supporting structure. The end of the retarding lever 22 which is distant from the pinion 25 carries a pin 28 which is adapted to cooperate with a camming edge of an adjustable exposure-determining cam 30. A spring 29 is coiled about the pin 23 and has free ends respectively engaging a pin carried by the lever 22 and a stationary pin of the shutter so that the spring 29 urges the retarding lever 22 in a direction opposite to that indicated by the arrow $d$ in FIG. 1. The schematically and fragmentarily illustrated controlling cam 30 is preferably a part of an unillustrated adjusting ring which is accessible to the operator for adjusting the exposure. This adjusting ring can be turned by hand and can cooperate with a scale of exposure values, so that in this way it is possible to select a position of the ring 30 which will provide a given exposure. However, instead of adjusting the ring 30 by hand it is also possible to turn the ring 30 in response to movement of a scanning mechanism into engagement with the pointer which is connected to the moving coil of a galvanometer which responds to the lighting conditions in a manner well known in the art, so that in this way the structure can also be automatically set in accordance with the lighting conditions.

A cocking lever 31 is accessible to the operator for cocking the shutter, and this cocking lever 31 has an inner free end 31a which is adapted to engage a pin 32 fixedly carried by the leading ring 1 in order to turn the latter in a direction opposite to that indicated by the arrow $a$. The outer end of the lever 31, which is supported for rotary movement by a stationary pivot pin 33, extends through a slot 34 of the shutter housing to the exterior where the outer end of the lever 31 is accessible to the operator, this slot 34 being formed in the outer wall 35 of the shutter housing. A spring 36 is coiled about the pin 33 and respectively engages pins carried by the stationary shutter wall and the lever 31 for urging the latter to turn in a direction opposite to that indicated by the arrow $b$ in FIG. 1. The lever 31 is turned in the direction of the arrow $b$ in order to cock the shutter.

The structure also includes a release lever 38 supported for turning movement by a stationary pin 37 and urged by spring 41 in the direction of the arrow $c$ shown in FIG. 1, this lever 38 having a free end extending through a slot 40 of the wall 35, so that in this way the lever 38 is accessible to the operator. The inner end 38a of the lever 38 is adapted to cooperate with a notch 39 formed in the outer periphery of the leading ring 1, for retaining this leading ring 1, in opposition to the spring 10, in its cocked position illustrated in FIG. 1.

Assuming now that the parts are cocked, as shown in FIG. 1, and that the operator now turns the release lever 38 in a direction opposite to that indicated by the arrow $c$, then the end 38a of the lever 38 will move out of the notch 39 so as to release the ring 1 which now can be returned by the spring 10 to its rest position. However, the turn movement of the ring 1 from its illustrated cocked position to its rest position is continuously retarded throughout the entire return movement thereof by the retarding means 16–19.

Of course, at the instant when the ring 1 is released for return to its rest position the spring 11 also seeks to return the ring 2 to its rest position, but at this time, although the projection 14 is free to follow the projection 12, the adjustable retarding means comes into play for preventing the return of the trailing ring 2 together with the leading ring 1. Directly after the release of the ring 2, its arm 20 engages the projection 21 of the retarding lever 22, and before the ring 2 can return to its rest position the arm 20 of the ring 2 must turn the lever 22 in opposition to the spring 29 through a distance sufficient to permit the outer periphery of the projection 20 to slide along the inner end of the projection 21, and in the rest position of the parts the inner end of the projection 21 engages the outer periphery of the projection 20, so that when the shutter is cocked this projection 20 moves beyond the projection 21 so as to release the lever 22 to the force of the spring 29. Before the spring 11 can displace the ring 2 and the projection 20 through the small angular distance required to situate the inner end of the nose 21 in engagement with the outer periphery of the projection 20, it is necessary for the spring 11 to overcome the retarding force of the second retarding means which retards the trailing ring means 2. Thus, this latter adjustable retarding means 22–26 prevents the ring 2 from returning to its rest position for a predetermined period of time. This latter period of time depends upon the adjustment of the adjustable retarding means 22–26. It is possible for the cam 30 of course to have a position such as that shown in FIG. 1, where almost the entire length of the projection 21 overlaps the projection 20, so that with this setting a relatively great retarding of the ring 2 is provided. However, if the camming ring 30 is adjusted so that only a small portion of the projection 21 overlaps the projection 20, then a relatively short retarding of the ring 2 will result.

Referring now to FIGS. 2 and 3, the manner in which the structure of FIG. 1 operates is graphically illustrated in these figures for two different settings of the ring or cam 30, respectively.

In the graphs of FIGS. 2 and 3 the abscissa represents the time which has elapsed from the moment when the ring 1 is released for return to its rest position, and the ordinate represents the angles through which the rings 1 and 2 turn, the angle $\alpha$ representing the angular turning of the ring 1, while the angle $\beta$ represents the angular distance through which the ring 2 turns.

Referring now to FIG. 2, it will be seen that this graph illustrates the operation for an intermediate degree of retarding action provided by the adjustment of the retarding means 22–26. As may be seen from FIG. 2, the angle $\alpha$ through which the ring 1 turns during its return to its rest position constantly increases in a uniform manner until the point A is reached, and this point represents the instant when the ring 1 has returned to its rest position so that the ring 1 stops turning when it reaches the point A. On the other hand, with this intermediate setting of the retarding means 22–23, the return of the ring 2 to its starting posiion is of course retarded, and the dotted line $\beta$ indicates the operation of the ring 2. As may be seen from FIG. 2 initially the ring 2 turns through only an extremely small angle, and this is the relatively small almost negligible angle through which the ring 2 turns while its arm 20 remains in engagement with the projection 21. However, at the instant when the retarding means 22–26 is overcome, which is to say when the outer periphery of the arm 20 reaches the inner end of the projection 21, the ring 2 will be suddenly released to the full force of the spring 11 which will now return the ring 2 to its starting position without substantially any restraint on the movement of the ring 2 at this time, and the moment when the retarding means 22–26 releases the ring 2 is illustrated at the point B in FIG. 2, and it will be seen that beyond this point B the angular distance $\beta$ through which the ring 2 turns very suddenly increases, until the ring 2 reaches its rest position.

Of course, when the ring 2 reaches its rest position the shutter blades will again be closed, and the instant when the shutter closes is indicated at the point C of the curve $\alpha$–$\beta$ which is shown in dot-dash lines. This curve $\alpha$–$\beta$ of course indicates the extent to which the blades are turned so as to provide the exposure aperture, and of course it is clear that with the setting of FIG. 2 the exposure aperture will have an intermediate magnitude indicated by the curve $\alpha$–$\beta$.

Coming now to FIG. 3, the same operations as those of FIG. 2 are illustrated for a setting of the retarding means 22–26 which provides a much smaller retarding action than that of FIG. 1. With the setting which provides the diagram of FIG. 3 the projection 21 overlaps the arm 20 to only a small degree. The leading ring 1 of course still operates in the same way as in FIG. 2, so that the curve $\alpha$ is the same as that of FIG. 2 and of course at the point A the ring 1 has reached its rest position. However, because of the smaller retarding force the ring 2 is released by the retarding means at the point D in FIG. 3 and then very quickly turns to join the ring 1 in its return movement to the point A. At the point E in FIG. 3 the projection 14 of the trailing ring 2 has reached the projection 12 of the leading ring 1, and now of course the shutter is fully closed and the rings 1 and 2 turn together from the point E to the point A so that the shutter remains closed. It is apparent, therefore, that while the exposure time with the setting of FIG. 3 is less than that of FIG. 2, also the aperture has been reduced. This is immediately apparent from comparing the curves $\alpha$–$\beta$ of FIG. 3 with that of FIG. 2. It is thus clear from the diagrams of FIGS. 2 and 3 that with the adjustable retarding means 22–26 it is possible to provide any desired exposure time, although with the relatively long exposure times, which can be extended beyond the time when the ring 1 reaches its rest position, the aperture will of course be fully open. In other words at any setting where the trailing ring 2 does not start to return toward its rest position until after the leading ring 1 has reached its rest position, the shutter will necessarily provide the largest possible exposure aperture.

After an exposure has been completed in the above-described manner with the embodiment of FIG. 1, the lever 31 is turned by the operator in the direction of the arrow $b$ in order to cock the shutter in preparation for making the next exposure. The inner end 31a of the arm 31 will now engage the pin 32 so as to turn the leading ring 1 in opposition to the spring 10 in a direction opposite to that indicated by the arrow $a$. Because the projection 14 is in the path of turning of the projection 12 the trailing ring 2 will necessarily turn with the ring 1 at this time so that the spring 11 is also tensioned. When the rings 1 and 2 reach their cocked positions, and it should be noted that at this time since there is no relative turning between these rings the shutter blades remain in their closed position, the inner end 38a of the release lever 38 is urged by the spring 41 in the direction of the arrow $c$ into the notch 39, so that the return of the rings 1 and 2 back to their rest positions is prevented until the operator turns the release lever 38 in a direction opposite to that indicated by the arrow $c$, so as to repeat the operations described above.

When the operator releases the cocking lever 31 it is returned by the spring 36 to the illustrated rest position of the cocking lever.

According to the embodiment of the invention which is illustrated in FIG. 4, there is also a pair of shutter rings 50 and 51, and in this case it is the inner shutter ring 50 which is the leading ring while the outer shutter ring 51 is the trailing ring. The inner ring 50 is pivotally connected by pivot pins 52 with the pair of shutter blades 54 and 55, and the outer or trailing ring 51 is connected by pins 53 with the shutter blades, these pins 53 respectively extending into slots of the shutter blades. Here again it is to be understood that the invention is by no means limited to a shutter which includes only a pair of shutter blades. The leading ring 50 is provided with an outwardly directed projection 56 which, by engagement with a stationary stop member 57, determines the rest position of the ring 50 under the action of the spring 58 which urges the ring 50 in the direction of the arrow $e$ to its rest position. The trailing ring 51 has an inwardly directed projection 59 overlapping the projection 56, and in the cocked position of the shutter which is shown in FIG. 4 the projection 59 engages the projection 56. A spring 60 urges the trailing ring 51 to turn in the direction of the arrow $c$.

As was the case with the embodiment of FIG. 1, the leading ring 50 is provided with teeth 61 at its outer periphery, and these teeth mesh with a pinion 62 which is coaxially fixed with an escapement wheel 63 which meshes with an escapement anchor 65, the coaxial elements 62 and 63 being supported for rotary movement by a stationary shaft 64, so that this embodiment also includes a retarding means which is operatively connected with the leading ring 50 for retarding the latter in a substantially uniform manner throughout its return movement.

In order to cock and release the shutter of FIG. 4, there is available to the operator a cocking and releasing lever 67 which is supported for turning movement by a stationary pin 66 and which has an arm 68 extending through a slot 69 of the outer shutter housing wall 70 to the exterior thereof so as to be accessible to the operator. Thus, the operator can actuate the lever 67 by hand.

This lever 67 carries a pin 71 on which a swing-lever 72 is supported for rotary movement, and a spring 73 is coiled about the pin 71 and engages pins carried by the lever 72 and the lever 67 for urging the lever 72 to turn in a clockwise direction about the pin 71, as viewed in FIG. 4, so that the spring 73 releasably maintains the edge portion 72a of the lever 72 in engagement with the pivot pin 66 for the lever 67. A spring 74 is coiled about the pin 66 and engages a stationary pin and a pin carried by the lever 67 so as to urge the latter to turn in a clockwise direction, opposite to the direction indicated by the arrow f in FIG. 4. When the operator turns the lever 67 in the direction of the arrow f, the free end of the lever 72 engages a pin 75 carried by the leading ring 50, so that this ring 50 will be turned in opposition to the spring 58 in a direction opposite to that indicated by the arrow e, and of course the trailing ring 51 will also be turned at this time in opposition to the spring 60, so that in this way the rings 50 and 51 are displaced from their rest toward their cocked positions by turning of the lever 67 in the direction of the arrow f.

The embodiment of FIG. 4 also includes an adjustable retarding means for adjustably determining the instant when the trailing ring 51 will be released for return to its rest position, and in this embodiment the adjustable retarding means is electrical. This adjustable retarding means includes the circuit 76 in which a source of current 77, a switch 78, and a photosensitive resistor 79 as well as a capacitor 79a are connected in series. The source of current 77 can be in the form of a battery or a miniature cell. Preferably the source 77 is situated in the interior of the camera and the photosensitive resistor 79 is situated at the front of the camera so as to be exposed through a suitable window or the like to the light to which the camera itself is exposed. Connected in parallel with the series connected resistor 79 and capacitor 79a is a relay 80 which includes an armature 81a in the form of a holding pawl 81 supported for turning movement on a stationary pivot and having a free end 82 which cooperates with a shoulder 83 formed at the periphery of the trailing ring 51 for preventing return of the latter to its rest position until the end 82 of the pawl 81 is displaced away from the shoulder 83. The arm 81b of the pawl 80 carries a stationary pin which is engaged by a spring 84 which is coiled about the pivot of the pawl and which engages a stationary pin so as to urge the pawl 81 in a clockwise direction, opposite to the direction indicated by the arrow g, into engagement with the stop 85, and the armature portion 81a of the pawl 81 is shown in engagement with the stop 85 in FIG. 4.

The switch 78 is a normally open switch which due to its own resiliency seeks in and of itself to remain in its open position. In order to close the switch 78 the leading ring 50 is provided with a projecting portion 86 which during the cocking of the shutter engages the switch 78 so as to close the latter just before the ring 50 is released for return to its rest position. It is to be noted that with the shutter of FIG. 4 the operator turns the cocking lever 67 in the direction of the arrow f until the inner free end of the swing lever 72 rides off the pin 75 whereupon the shutter is released to make an exposure. Thus, as the operator turns the cocking lever 67, the projection 86 of the ring 50 will approach the switch 78 and just before the tip of the lever 72 reaches and rides off the pin 75 the projection 86 will momentarily close the switch 78. In the position of the parts shown in FIG. 4, the projection 86 has just closed the switch 78 and the relay 80 is about to attract the armature portion 81a of the pawl 81 so as to move the pawl tooth 82 into engagement with the shoulder 83, but because of the very slight delay in the response of the relay 80 to the closing of the switch 78 the parts are shown in FIG. 4 in that instantaneous position they take just after the switch 78 is closed but just before the armature 81 has turned in the direction of the arrow g to the coil of the relay 80 so as to place the tooth 82 in engagement with the shoulder 83.

In order to make an exposure with the embodiment of FIG. 4, the operator turns the cocking and release lever 67 in the direction of the arrow f, so that the lever 72 engages the pin 75 and turns both of the rings 50 and 51 in a direction opposite to that indicated by the arrow e. In this way the spring 58 and 60 are simultaneously tensioned. At the end of the cocking movement, the projection 86 of the leading ring 50 engages and closes the switch 78. The circuit 76 is therefore closed and the capacitor 79a becomes charged. Also, the relay 80 becomes energized and turns the pawl 81 in the direction of the arrow g so that the tooth 82 engages the shoulder 83 to hold the trailing ring 51 against return movement from its cocked position.

The continued turning of the lever 68 by the operator causes the lever 72 to ride off the pin 75 so that the leading ring 50 is now released while the trailing ring 51 is retained in its cocked position, and the turning of the ring 50 with respect to the ring 51 will of course open the shutter blades. The retarding means 61–65 operates at this time to constantly and uniformly retard the return movement of the leading ring 50 throughout its entire return movement, by the spring 58. Immediately after the ring 50 starts its return movement the switch 78 opens and the flow of current in the circuit 76 is terminated. The shunt resistor 79, however, delays the deenergizing of the relay 80 because the compensating current of the shunt circuit flows through the relay coil. The time required for the relay 80 to release the pawl 81 to the spring 84 depends upon the resistance of the resistor 79, and this resistance of course is determined by the lighting conditions. The photosensitive resistor 79 is a conventional resistor of this type which provides a relatively small resistance at large light intensities and a relatively great resistance at low light intensities. The capacitor 79a is charged while the switch 78 is closed and after opening of the switch discharges through the relay 80 and the resistor 79. Therefore, at great light intensities when the resistance is small the discharge of the capacitor takes place very quickly and the relay 80 releases the lever 81 in a relatively short time so that a short exposure time is produced.

When the relay 80 releases the pawl 81 the spring 84 returns it into engagement with the stop 85. Now the trailing ring 51 is released for return by spring 60 to its rest position.

Thus, with this embodiment the electrical retarding means is capable of providing different exposure times and apertures in the same way as the mechanical retarding means of FIG. 1.

When the operator releases the lever 67, the spring 74 returns it to its rest position in a direction opposite to that indicated by the arrow f, and at this time the swing lever 72 can turn past the pin 75 since the spring 73 yields at this time and returns the lever 72 to its illustrated position relative to the lever 67 as soon as the lever 72 moves beyond the pin 75.

The shutter of FIG. 5 is identical with that of FIG. 4, the only difference being that the shutter of FIG. 5 can be retained in its cocked position and for this purpose the structure for cocking and releasing the shutter and for retarding the trailing ring 51 is different from that of FIG. 4. Thus, a rotary shaft 90, which is turned by the operator in connection with advance of the next film frame into position to be exposed, fixedly carries a cocking lever 91 which engages the pin 75 of the leading ring 50 to cock the shutter when the shaft 90 is turned in the direction of the arrow k. A spring 92 urges the lever 91 and the shaft 90 to a rest position where the lever 91 engages the stationary stop member 93.

The leading ring 50 of FIG. 5 carries a projection 94 which has a notch 94a for receiving the free end of the release lever 95 which is urged by a spring 96 in the direction of the arrow h against a stationary stop member 97. The release lever 95 is fixed to a shaft 98 which can be turned by the operator in a direction opposite to that indicated by the arrow h.

In this embodiment, the retarding means for the leading ring 50 is in the form of a rotary mass. Thus, in this case the pinion 62 is coaxially fixed with the rotary mass 99, this pinion 62 meshing with the teeth 61 of the ring 50 in the same way as in the embodiment of FIG. 4. Instead of this particular type of retarding means it is possible to use other known retarding structures such as, for example, a pneumatic retarding mechanism.

The electrical retarding means for the trailing ring 51 of FIG. 5 includes the electrical circuit 100 in which the source 101, the switch 102, the relay 103, a second switch 104, and a photosensitive resistor 105 are connected in series. The switch 102 is a normally closed switch capable of being opened by the projection 94 of the ring 50. The switch 104, on the other hand, is a normally open switch capable of being closed by the arm 106a of a pawl 106. This pawl 106 is turnably supported by a stationary pin 107 and is urged by a spring 108 into engagement with the stationary stop 109 as well as into engagement with the shoulder 110 of the trailing ring 51. Thus, when the arm 106b snaps behind the shoulder 110, the arm 106a will move to the stop 109 and close the switch 104.

The structure is shown in FIG. 5 in its cocked position. In order to make an exposure the operator will turn the release lever 95 in a direction opposite to that indicated by the arrow h, so that the projection 94 of the leading ring 50 is released and now the spring 55 can start to return the leading ring 50 in the direction of the arrow e back toward its rest position. The entire return movement of the leading ring 50 is however uniformly retarded by the retarding means 62, 99. At the beginning of the return movement of the leading ring 50, the projection 94 moves away from the switch 102 which therefore closes. Since the switch 104 is also closed at this time, current flows through the circuit 100.

The relay 103 will attract the armature 106a in the direction of the arrow i toward the coil of the relay after a time interval which is determined by the magnitude of the resistance provided by the photosensitive resistor 105, so that in this way the release of the trailing ring 51 is determined by the lighting conditions. The movement of the arm 106b of the pawl 106 away from the shoulder 110 of the trailing ring 51 permits the spring 60 to return the projection 59 into engagement with the projection 56 without any substantial resistance to the turning of the ring 51 at this time. The shutter blades will therefore return to their closed position, and with this construction it is apparent that the light intensity determines not only the exposure time but also the size of the exposure aperture.

In order to again cock the shutter of FIG. 5, the operator turns the cocking lever 91 in the direction of the arrow k. The lever 91 engages the pin 75 of the ring 50 so as to turn the latter together with the ring 51 in a direction opposite to that indicated by the arrow e, until the release lever 95 is again received in the notch 94a.

Of course, at the end of the cocking of the shutter the switch 102 is again opened and of course the switch 104 is closed.

Of course, the invention is not limited to the specific retarding structures described above and shown in the drawing. Thus, either electrical circuits can be used to accomplish the same results as those achieved by the disclosed electrical retarding structures of FIGS. 4 and 5. Furthermore, instead of the mechanical retarding means 22–26 of FIG. 1, it is possible to use a pneumatic retarding means capable of being automatically regulated in accordance with the lighting conditions. Thus, with such a construction the moving coil of the galvanometer will control the extent to which a cylinder of the pneumatic retarding structure is covered. The cover of the cylinder can be turned by the moving coil to a position providing a discharge opening for the cylinder which is of a larger or smaller size depending upon the angular position of the moving coil, so that the resistance to the movement of a piston in the cylinder can be regulated, and it is this piston which is displaced by the trailing ring until the piston reaches a position releasing the trailing ring for substantially unrestrained movement until its projection 14 engages the projection 12 of the leading ring. Thus, since the angular position of the moving coil of such an assembly is automatically determined by the lighting conditions, this pneumatic retarding means will accurately determine the extent of exposure in accordance with the lighting conditions.

Referring now to FIG. 6, there is shown therein a leading ring 1' which corresponds, for example, to the leading ring 1 of FIG. 1. Except for the structure described below and shown in FIG. 6, the embodiment of FIG. 6 is identical with that of FIG. 1. As may be seen from FIG. 6, the ring 1' carries a pin 680 which is received in an elongated slot 681 which is formed in a gear sector lever 683 which is supported for rotary movement by a pin 682 which is carried by the stationary transverse wall of the shutter. This gear sector lever 683 has an arcuate toothed portion 684 which meshes with a pinion 685. The pinion 685 is fixed coaxially with an escapement wheel 687 with which the pinion 685 is mounted for rotary movement on a pin 686. For example, the pinion 685 and escapement wheel 687 are fixed to the pin 686 which is in turn supported for rotary movement by any suitable bearings. An anchor 688 cooperates with the escapement wheel 687, and the anchor 688 is supported for rotary movement on a pin 689 carried by the supporting wall of the shutter.

In the position of the parts which is indicated in FIG. 6, the leading ring means 1' has run down and is in its rest position, and it is to be noted that in this position the slot 681, which together with the pin 680 forms a pin-and-slot connection between the lever 683 and the ring 1', extends substantially radially with respect to the ring 1'. When the shutter is cocked, the ring 1' is turned in a direction opposite to that indicated by the arrow a in FIG. 6, and thus at this time the gear sector lever 683 will be turned in the direction of the arrow z. As a result the pin 680 moves toward the free end of the lever 683 distant from its pivot 682, so that the pin 680 approaches the open end of the slot 681. Now when the leading ring 1' is released to run down, so that it turns in the direction of the arrow a, the transmission ratio between the ring 1' and the retarding means 685–689 continuously increases, inasmuch as the lever arm with which the lever 683 engages the pin 680 continuously decreases. Thus, the retarding force exerted by the retarding means 685–689 on the ring 1' continuously increases during the running down of the ring 1' as it returns in the direction of the arrow a to its rest position. Therefore, during the initial part of the return of the ring 1' to its rest position, the retarding force is at its minimum magnitude, so that the ring 1' can accelerate at a relatively rapid rate. In this way it is possible to achieve even under relatively low lighting conditions relatively short exposure times.

Referring now to FIG. 7, the structure illustrated therein is also shown in its run-down or rest position. The leading ring means 1″ of this embodiment is provided at an outer peripheral portion with a camming edge 690. The pin 691 engages the camming edge 690 so as to form a cam-follower pin, and this pin 691 is carried by the gear sector lever 692 of the retarding means of FIG. 7. A spring 693 is coiled about the pin 694, which serves to pivotally mount the lever 692, and this spring 693 engages a pin carried by the lever 692 as well as a stationary pin so as to urge the cam follower pin 691 into engagement with the cam 690.

The lever 692 has an arcuate toothed portion 695 which meshes with a pinion 696 which is coaxially fixed with a gear 697 which together with the pinion 696 is mounted on a pivot 698 for rotary movement, and this pin 698 may be fixedly carried by the transverse wall of the shutter, for example. The gear 697 in turn meshes with a pinion 699 which is coaxially fixed with a rotary mass 700 and which is mounted together with the mass 700 for rotary movement on a pin 701 fixedly carried by the shutter, so that in the embodiment of FIG. 7 the retarding means provides the retarding force through the illustrated transmission and the inertia of the rotary mass 700.

This particular embodiment enables, in an extremely simple manner, the cam 690 to be given a curvature which will provide between the leading ring 1″ and the retarding means 696–701 a transmission ratio which continuously increases as the ring 1″ returns to its rest position in the direction of the arrow $a$. With this particular embodiment the designer has a very great freedom as to how to curve the cam 690 so as to distribute the increasing retarding force in a desired manner during the running down movement of the leading ring 1″.

The embodiment of FIG. 8 provides a retarding means which includes, in addition to the retarding structure shown in FIG. 1, a portion which actually serves to drive the leading ring means 1‴ back to its rest position, and this latter portion of the retarding means of FIG. 8 may be used by itself for returning the leading ring means 1‴ back to its rest position or may be used in addition to the spring 10 of FIG. 1.

Thus, referring to FIG. 8, it will be seen that the leading ring means 1‴ has a toothed peripheral portion 705 which meshes with a pinion 702 which is coaxially fixed with an escapement wheel 703 which together with the pinion 702 is mounted for rotary movement on a pin 704 carried by the stationary shutter wall, and the escapement wheel 703 cooperates with the anchor 706. Thus, this part of the retarding means of FIG. 8 will provide a constant retarding action on the wing 1‴ during its running down movement, and this structure may be identical with the leading-ring retarding structure of FIG. 1 and operates in precisely the same way.

In addition, the ring 1‴ fixedly carries a pin 707 which is received in a slot 708 which is formed in one arm of a lever 710 which is supported for turning movement by a pin 709 carried by the stationary supporting wall of the shutter. The other arm of this lever 710 is fixed to one end of a driving spring 711 whose other end is fixed to a stationary pin 712, and this spring 711 acts through the lever 710 to return the ring 1‴ in the direction of the arrow $a$ to its rest position, so that the spring 711 may take over the function of the spring 10 of FIG. 1, or, if preferred, this spring 711 and the lever 710 may be used in addition to the spring 10 of FIG. 1. It is clear that when the ring 1‴ is moved to its cocked position, in the manner described above for the ring 1 of FIG. 1, the spring 711 will be tensioned.

It is to be noted that in the run-down or rest position of the ring 1‴, the pin 707 is situated adjacent the free end of the lever 710 which is distant from the pivot 709, so that the pin 707 is situated adjacent the open end of the slot 708. During the cocking of the ring 1‴, so that it turns in the direction opposite to that indicated by the arrow $a$, the pin 707 approaches the inner, closed end of the slot 708, and in the cocked position of the ring 1‴ the pin 707 will be situated adjacent to the closed end of the slot 708 which at this time will extend substantially radially with respect to the ring 1‴.

It is apparent from FIG. 8 that the portion 707–712 of the retarding means of this embodiment and the ring 1‴ have with respect to each other a transmission ratio which continuously decreases during the return of the ring 1‴ from its cocked to its rest position in the direction of the arrow $a$. Therefore, during the initial part of the running down movement of the ring 1‴ the greatest driving force on the ring 1‴ is provided by the spring 711, through the lever 710, and this force diminishes continuously during the running down movement of the ring 1‴, so that in this way also it is possible to achieve the desired effect of the present invention, namely the provision of the fastest possible acceleration of the leading ring means at the beginning of its running down movement.

It is possible to increase this effect even further by combining the embodiment of FIG. 8 with the embodiment of FIG. 7 or with the embodiment of FIG. 6. Thus, instead of using the retarding assembly 702–706 of FIG. 8, it is possible to use the retarding means of FIG. 7 or the retarding means of FIG. 6 together with the portion 707–712 of the retarding means of FIG. 8, so that in this way the accelerating movement of the leading ring means during initial part of its return to its rest position can be derived not only from a structure as shown either in FIG. 6 or in FIG. 7 but also at the same time from a driving structure as illustrated in FIG. 8.

Of course, the present invention is not limited to the particular structures for interconnecting the various elements shown in FIGS. 6–8.

It will be understood that each of the elements described above, or two or more together, may also find a useful application in other types of camera differing from the types described above.

While the invention has been illustrated and described as embodied in shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a plurality of shutter blades; a pair of coaxial shutter ring means operatively connected to said shutter blades for opening and closing the latter, one of said ring means being a leading ring means which returns from a cocked position to a rest position in advance of the other of the ring means, which is a trailing ring means, for opening the shutter blades to make an exposure, the trailing ring means upon following the leading ring means to its rest position returning the blades to their closed position; first retarding means operatively connected to said leading ring means for retarding the return thereof to said rest position during the entire return movement of said leading ring means and with a retarding force which gradually increases during return of said leading ring means so that initially said leading ring means during the return thereof can accelerate toward its rest position; and adjustable second retarding means operatively connected to said trailing ring means for retarding the release thereof, for return from a cocked to a rest position, to an extent which is adjustable for releasing said trailing ring means before, at, or after the end of the return movement of said leading ring means.

2. In a camera, in combination, a plurality of shutter blades; a pair of coaxial shutter ring means operatively connected to said shutter blades for opening and closing the latter, one of said ring means being a leading ring means which returns from a cocked position to a rest position in advance of the other of the ring means, which is a trailing ring means, for opening the shutter blades to make an exposure, the trailing ring means upon following the leading ring means to its rest position returning the blades to their closed position; first retarding means operatively connected to said leading ring means for retarding the return thereof to said rest position during the entire return movement of said leading ring means and with a retarding force which gradually increases during return of said leading ring means so that initially said leading ring means during the return thereof can accelerate toward its rest position, said first retarding means and said leading ring means having with respect to each other a transmission ratio which increases during the return movement of said leading ring means; and adjustable second retarding means operatively connected to said trailing ring means for retarding the release thereof, for return from a cocked to a rest position, to an extent which is adjustable for releasing said trailing ring means before, at, or after the end of the return movement of said leading ring means.

3. In a camera, in combination, a plurality of shutter blades; a pair of coaxial shutter ring means operatively connected to said shutter blades for opening and closing the latter, one of said ring means being a leading ring means which returns from a cocked position to a rest position in advance of the other of the ring means, which is a trailing ring means, for opening the shutter blades to make an exposure, the trailing ring means upon following the leading ring means to its rest position returning the blades to their closed position; first retarding means operatively connected to said leading ring means for retarding the return thereof to said rest position during the entire return movement of said leading ring means and with a retarding force which gradually increases during return of said leading ring means so that initially said leading ring means during the return thereof can accelerate toward its rest position, said first retarding means having a portion operatively connected to said leading ring means and said leading ring means and said portion of said first retarding means having with respect to each other a transmission ratio which decreases during return movement of said leading ring means; and adjustable second retarding means operatively connected to said trailing ring means for retarding the release thereof, for return from a cocked to a rest position, to an extent which is adjustable for releasing said trailing ring means before, at, or after the end of the return movement of said leading ring means.

4. In a camera as recited in claim 2, said first retarding means including a rotary gear sector formed with an elongated slot and said leading ring means carrying a pin which extends into said slot, and said slot extending substantially radially with respect to said leading ring means when said leading ring means is in said rest position thereof.

5. In a camera as recited in claim 2, said first retarding means including a gear sector and said leading ring means and gear sector being operatively connected to each other by a pin-and-slot connection which has a slot which extends substantially radially with respect to said leading ring means when said leading ring means is in said rest position thereof.

6. In a camera as recited in claim 2, said first retarding means including a gear sector carrying a cam-follower pin, and said leading ring means having an outer peripheral portion having the configuration of a cam which engages said pin to provide said transmission ratio between said retarding means and said leading ring means during return of the latter to said rest position thereof, and said retarding means including a spring acting on said gear sector for urging said pin into engagement with said peripheral portion of said leading ring means.

7. In a camera as recited in claim 3, said portion of said first retarding means including a spring for urging said leading ring means back to said rest position thereof and a lever mounted for turning movement intermediate its ends, having one end connected to said spring, and having an opposite end connected by a pin-and-slot connection to said leading ring means, said pin-and-slot connection having an elongated slot which extends substantially radially with respect to said leading ring means when the latter is in said cocked position thereof.

8. In a camera as recited in claim 7, said slot of said pin-and-slot connection being formed in said lever and said pin being carried by said leading ring means.

9. In a camera, in combination, a plurality of shutter blades; a pair of coaxial shutter ring means operatively connected to said shutter blades for opening and closing the latter, one of said ring means being a leading ring means which returns from a cocked position to a rest position in advance of the other of the ring means, which is a trailing ring means, for opening the shutter blades to make an exposure, the trailing ring means upon following the leading ring means to its rest position returning the blades to their closed position; first retarding means operatively connected to said leading ring means for retarding the return thereof to said rest position during the entire return movement of said leading ring means and with a retarding force which gradually increases during return of said leading ring means so that initially said leading ring means during the return thereof can accelerate toward its rest position, said first retarding means including at least one of the following: (a) a rotary gear sector connected by a pin-and-slot connection to said leading ring means, and (b) a spring for urging said leading ring means to return to said rest position thereof and a lever having an intermediate pivot point and connected at one end to said spring and having at its opposite end a pin-and-slot connection to said leading ring means; and adjustable second retarding means operatively connected to said trailing ring means for retarding the release thereof, for return from a cocked to a rest position, to an extent which is adjustable for releasing said trailing ring means before, at, or after the end of the return movement of said leading ring means.

10. In a camera, in combination, a plurality of shutter blades; a pair of coaxial shutter ring means operatively connected to said shutter blades for opening and closing the latter, one of said ring means being a leading ring means which returns from a cocked position to a rest position in advance of the other of the ring means, which is a trailing ring means, for opening the shutter blades to make an exposure, the trailing ring means upon following the leading ring means to its rest position returning the blades to their closed position; first retarding means operatively connected to said leading ring means for retarding the return thereof to said rest position during the entire return movement of said leading ring means, said first retarding means including spring means and force transmitting means connecting said spring means with said leading ring means and having a force transmission ratio decreasing during return movement of said leading ring means from said cocked position to said rest position so that said spring means urges said leading ring means to said rest position with a force which gradually decreases during the return movement of said leading ring means; and adjustable second retarding means operatively connected to said trailing ring means for retarding the release thereof, for return from a cocked to a rest position, to an extent which is adjustable for releasing said trailing ring means before, at, or after the end of the return movement of said leading ring means.

11. In a camera as recited in claim 10, said force transmitting means including a lever mounted for turning movement intermediate its ends, having one end connected to said spring means and having an opposite end connected by a pin-and-slot connection to said leading ring means, said pin-and-slot connection having an elongated slot which extends substantially radially with respect to said leading ring means when the latter is in said cocked position thereof.

12. In a camera as recited in claim 11, said slot of said pin-and-slot connection being formed in said lever and said pin being carried by said leading ring means.

References Cited by the Examiner

UNITED STATES PATENTS 2,890,640  6/1959  Noack _____ 95—63

JOHN M. HORAN, *Primary Examiner*.